US 6,750,294 B2

(12) United States Patent
Sugiyama et al.

(10) Patent No.: US 6,750,294 B2
(45) Date of Patent: Jun. 15, 2004

(54) PLASTIC OPTICAL FIBER

(75) Inventors: Norihide Sugiyama, Kanagawa (JP); Tsuyoshi Onishi, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 191 days.

(21) Appl. No.: 09/877,056

(22) Filed: Jun. 11, 2001

(65) Prior Publication Data

US 2002/0009276 A1 Jan. 24, 2002

(30) Foreign Application Priority Data

Jun. 12, 2000 (JP) ........................................ 2000-175203

(51) Int. Cl.⁷ ............................................... C08L 27/12
(52) U.S. Cl. ........................ 525/199; 385/124; 525/200; 526/245; 526/246; 526/247
(58) Field of Search .................................. 525/199, 200; 526/245, 246, 247; 385/124

(56) References Cited

U.S. PATENT DOCUMENTS

| | | | | |
|---|---|---|---|---|
| 4,617,350 A | * | 10/1986 | Maeda et al. | 525/153 |
| 4,756,599 A | * | 7/1988 | Maeda et al. | 385/123 |
| 4,822,122 A | * | 4/1989 | Yamamoto et al. | 385/124 |
| 4,861,835 A | * | 8/1989 | Maeda et al. | 525/200 |
| 5,760,139 A | | 6/1998 | Koike et al. | |
| 5,783,636 A | | 7/1998 | Koike et al. | |
| 5,916,971 A | | 6/1999 | Koike et al. | |
| 6,071,441 A | | 6/2000 | Koganezawa et al. | |
| 6,074,511 A | | 6/2000 | Takano et al. | |
| 6,111,062 A | | 8/2000 | Shirota et al. | |
| 6,166,107 A | * | 12/2000 | van Duijnhoven et al. | 523/201 |
| 6,166,125 A | | 12/2000 | Sugiyama et al. | |
| 6,221,987 B1 | | 4/2001 | Sugiyama | |
| 6,225,382 B1 | | 5/2001 | Matsukura et al. | |
| 6,271,312 B1 | | 8/2001 | Koike et al. | |
| 6,448,452 B2 | | 9/2002 | Kashiwagi et al. | |

FOREIGN PATENT DOCUMENTS

| | | |
|---|---|---|
| EP | 0 375 178 | 6/1990 |
| EP | 0 752 598 | 1/1997 |
| JP | 08005848 | 1/1996 |
| JP | 08304636 | 11/1996 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

A plastic optical fiber which is a graded index optical fiber having a concentric inner/outer at least two layer structure, wherein the inner layer has a graded index structure made of a non-crystalline fluoropolymer (a) having substantially no C—H bond, and the outer layer has a refractive index lower than the refractive index of the outermost portion of the inner layer and is made of a fluoropolymer material (c) selected from the following 1) and 2):

1) a fluoropolymer (d) containing the same polymerized units as the polymerized units in the fluoropolymer (a), and 2) a mixture (f) of a fluoropolymer (a) with another fluoropolymer (e).

20 Claims, 2 Drawing Sheets

PLASTIC OPTICAL FIBER

The present invention relates to a graded index plastic optical fiber having a small bending loss and being excellent in heat resistance and heat and humidity resistance.

Known as a graded index plastic optical fiber is a plastic optical fiber having a graded index distribution structure comprising, as a matrix, a non-crystalline fluoropolymer having substantially no C—H bond and a substance having a different refractive index from the matrix, distributed with a concentration gradient in a radial direction (see JP-A-8-5848). Further, JP-A-8-304636 discloses an optical fiber having a polymer with a refractive index lower than matrix, provided on the outer circumference of the matrix, in order to avoid an increase of the attenuation loss by bending in such a graded index optical fiber.

The conventional graded index optical fiber having such a low refractive index polymer provided on the outer circumference, has had a problem that the attenuation loss increases when it is subjected to a heat resistance/heat and humidity resistance tests such as long term heat resistance test (70° C. for 1,000 hours), a temperature cycle test (70° C./−20° C.×10 times) or a heat and humidity cycle test (65° C., humidity of 95%/−10° C.×10 times).

The present inventors have analyzed the fibers after the heat cycle test and the heat and humidity cycle test, and as a result, have found that peeling which takes place between the outer layer made of the low refractive index polymer and the inner layer having a graded index distribution formed, is the cause for an increase of the attenuation loss.

On the basis of the recognition of such problems, the present inventors have conducted an extensive study and as a result have found that in order to improve the adhesion between the inner layer and the outer layer, it is effective to employ a polymer having a high affinity to the polymer constituting the matrix of the inner layer, as the low refractive index material of the outer layer. Namely, the present invention is to provide a graded index optical fiber anew wherein an outer layer is formed outside the inner layer having a graded index formed, by means of a polymer having a refractive index lower than the refractive index of the outermost portion of the inner layer and a good adhesive property, to provide an optical fiber having an increase of the attenuation loss by bending reduced while maintaining the heat resistance and the heat and humidity resistance. The present invention is the following invention based on such a discovery.

A plastic optical fiber which is a graded index optical fiber having a concentric inner/outer at least two layer structure, wherein the inner layer has a graded index structure made of a non-crystalline fluoropolymer (a) having substantially no C—H bond, and the outer layer has a refractive index lower than the refractive index of the outermost portion of the inner layer and is made of a fluoropolymer material (c) selected from the following 1) and 2):

1) a fluoropolymer (d) containing the same polymerized units as the polymerized units in the fluoropolymer (a), and
2) a mixture (f) of a fluoropolymer (a) with another fluoropolymer (e).

In the optical fiber of the present invention, in order for the fluoropolymer material (c) to have a high adhesive property with the fluoropolymer (a) and in order not to let the heat resistance and the heat and humidity resistance of the optical fiber deteriorate, the glass transition temperature Tgc of the fluoropolymer material (c) is preferably 70° C.<Tgc<Tga+30° C., where Tga is the glass transition temperature of the fluoropolymer (a). Further, the fluoropolymer (d) preferably contains at least 30 mol % of the same polymerized units as the polymerized units in the fluoropolymer (a). Here, the polymerized units in the present invention are meant for repeating units in a polymer formed by a polymerization reaction of a monomer.

Further, in order not to let the attenuation loss of the optical fiber increase, the refractive index of the fluoropolymer material (c) is preferably lower by at least 0.03 than the refractive index of the outermost portion of the inner layer. Here, the refractive index in the present invention is a refractive index against sodium D line spectrum.

In the optical fiber of the present invention, its inner layer is preferably an inner layer which contains the fluoropolymer (a) as a matrix, and a substance (b) having a different refractive index is distributed in the matrix to form the graded index structure. As the fluoropolymer (a), a fluoropolymer having a ring structure in its main chain as disclosed in the above-mentioned prior art is preferred. Likewise, the fluoropolymer (d) and the fluoropolymer (e) are preferably fluoropolymers having ring structures in their main chains. Further, the optical fiber of the present invention preferably has a protective coating layer made of a synthetic resin provided outside the outer layer. As such a synthetic resin, a thermoplastic resin made of a polymer other than the fluoropolymer (a), the fluoropolymer (d) and the fluoropolymer (e), which has heretofore been used or proposed to be used as a protective coating layer for an optical fiber, is preferred.

Figure 1A:
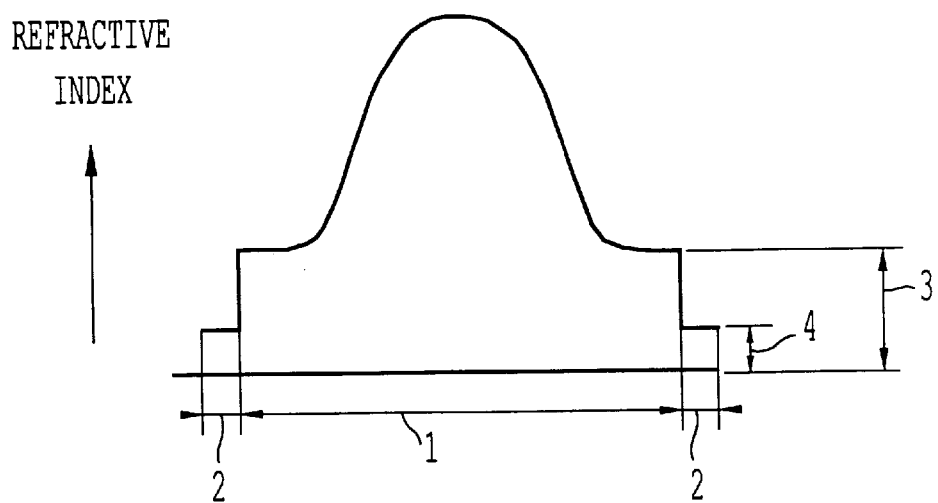
FIG. 1 is a graph showing the refractive index distribution in a radial direction in the cross-section of an optical fiber of the present invention.
Figure 1B:
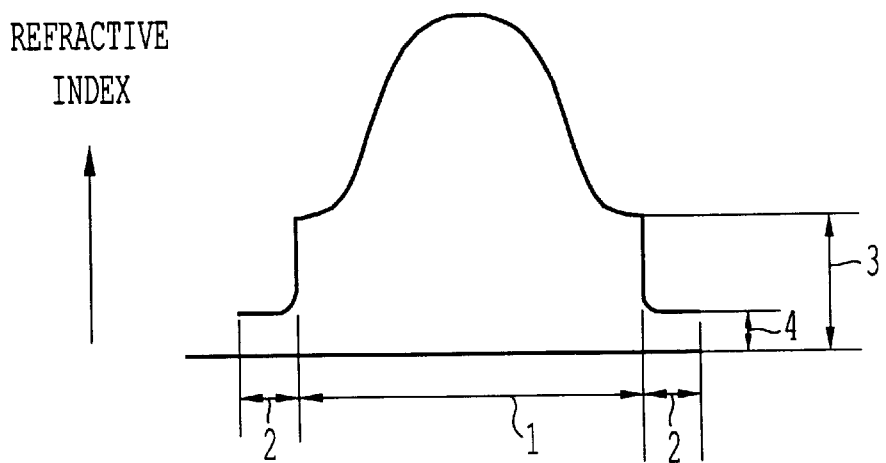
Figure 2C:
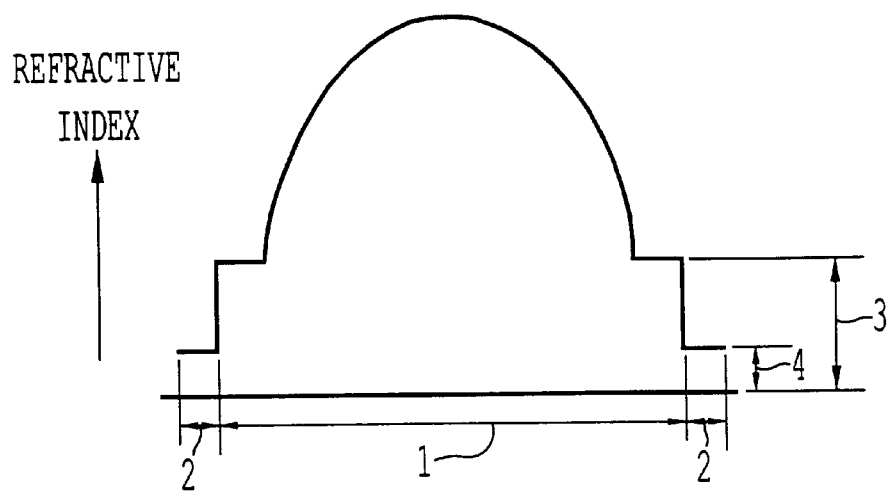
FIG. 2 is a graph showing the refractive index distribution in a radial direction in the cross-section of an optical fiber of the present invention.
Figure 2D:
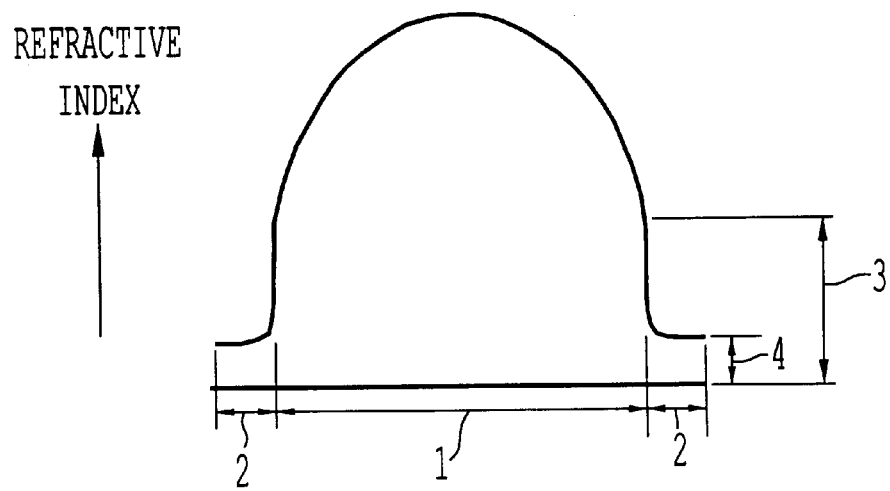

The reference numerals in the Figures have the following meanings:

1: inner layer
2: outer layer
3: refractive index level of the outermost portion of the inner layer
4: refractive index level of the outer layer The refractive index distributions in a radial direction of the optical fibers of the present invention are shown in FIGS. 1(A) and (B) and FIGS. 2(C) and (D). The abscissa represents the diameter of the optical fiber, and the ordinate represents the refractive index. Within the inner layer (range (1)), the optical fiber has a refractive index distribution such that the refractive index is high at the center, and the refractive index decreases as the position is apart from the center. The refractive index of the outer layer (range (2)) is lower than the refractive index of the outermost portion of the inner layer. The refractive index distribution in the inner layer may be one showing a gentle distribution at the peripheral portion as shown in FIGS. 1(A) and (B) or may be the one showing a parabolic distribution as shown in FIGS. 2(C) and (D). From the viewpoint such that the band width is broad, one having the latter parabolic refractive index distribution is preferred. On the other hand, the refractive index may have a distribution such that it continuously lowers to the outermost portion of the inner layer, as shown in FIG. 1(B) and FIG. 2(D), or it may continuously lowers from the center to an intermediate portion of the inner layer, and the inner layer outside thereof, has a constant refractive index, as shown in FIG. 1(A) and FIG. 2(C). The outer layer in FIG. 1(B) and FIG. 2(D) functions substantially as a clad layer. Further, the portion where the refractive index is constant in the inner layer as shown in FIG. 1(A) and FIG. 2(C), functions as a clad layer, and the outer layer functions as a second clad layer.

The refractive index of the outer layer is preferably lower by at least 0.003 than the refractive index of the outermost layer of the inner layer to reduce the bending loss. The difference in the refractive index is more preferably at least 0.005. Further, the numerical aperture NA which is calculated from the maximum refractive index at the center portion and the minimum refractive index at the outer layer, is preferably at least 0.20, more preferably at least 0.23, particularly preferably at least 0.25. In general, the bending loss varies depending upon the core diameter of an optical fiber, and the larger the core diameter, the larger the bending loss. The core diameter of the optical fiber in the present invention is not particularly limited, but it is preferably at most 1,000 μm, more preferably at most 500 μm, particularly preferably at most 200 μm. Further, the core portion of the optical fiber in the present invention is a portion having a refractive index higher by at least 5% of the difference between the highest refractive index in the inner layer and the lowest refractive index in the inner layer than the lowest refractive index in the inner layer.

The optical fiber of the present invention may further have a protective coating layer outside the outer layer. The material for this protective coating layer is not particularly limited so long as it is a synthetic resin, and it is possible to employ a thermoplastic resin or a cured product of a curable resin, which is a material other than the fluoropolymer (a), the fluoropolymer (d) and the fluoropolymer (e). Among them, a synthetic resin is preferred which has heretofore been used or proposed to be used as a protective coating layer for an optical fiber. When it is required to increase the mechanical strength as a role of the protective coating layer, it is required to be a layer having a thickness of at least a certain level, and it is preferred to employ a synthetic resin having high tensile strength or modulus of elasticity. As the material for the protective coating layer, a thermoplastic resin is preferred, and particularly preferred is an acrylic resin, a polycarbonate resin or a cyclic polyolefin resin. Further, this protective coating layer may be of a multilayer structure of two or more layers, of which one layer may be made of a relatively soft thermoplastic resin such as a vinyl chloride resin, a polyolefin resin, a poly(vinylidene fluoride) resin or ethylene/tetrafluoroethylene copolymer resin.

As a method for forming a graded refractive index distribution in the inner layer in the present invention, it is preferred to employ a method wherein a fluoropolymer (a) is used as the matrix, and a substance (b) having a different refractive index is distributed in the matrix to form a graded index distribution structure. Otherwise, it may be a method wherein two or more fluoromonomers capable of forming a polymer having the refractive index changed depending upon the compositional proportions for polymerization, are combined to form an inner layer composed of a fluoropolymer (a) having the compositional proportions for polymerization varied in the radial direction from the center. The fluoropolymer (a) is required to be a non-crystalline fluoropolymer in order to have a low attenuation loss, and it is required to have a chemical structure having no C—H bond to make optical communication in the near infrared wavelength band possible. The substance (b) is likewise one soluble in the fluoropolymer and it preferably has a chemical structure having no C—H bond.

The fluoropolymer material (c) constituting the outer layer is required to be a material having a refractive index lower than the refractive index of the outermost portion of the inner layer. The fluoropolymer (d) contains the same polymerized units as the polymerized units in the fluoropolymer (a). The mixture (f) is a mixture of the fluoropolymer (a) with another fluoropolymer (e). Here, the fluoropolymer (d) and the fluoropolymer (e) may be the same polymer.

As the fluoropolymer (d) contains a larger amount of the same polymerized units as the polymerized units in the fluoropolymer (a) (hereinafter referred to as polymerized units a), the adhesive property with the fluoropolymer (a) is improved, and the heat resistance and the heat and humidity resistance can more easily be maintained, such being preferred. On the other hand, the difference in the refractive index between the two fluoropolymers becomes small, and accordingly, in order to maintain a predetermined difference in the refractive index, the proportion of the polymerized units a in the fluoropolymer (d) is inevitably limited. The polymerized units a are not limited to one type of polymerized units, and in a case where both fluoropolymers are copolymers, two or more polymerized units may be common. The proportion of the polymerized units a in the total polymerized units in the fluoropolymer (d) is preferably at least 20 mol %, particularly preferably at least 30 mol %. The upper limit is not particularly limited so long as the predetermined difference in the refractive index between the two fluoropolymers can be maintained, but usually, it is 95 mol %, preferably 85 mol %. Further, the fluoropolymer (d) is preferably optically transparent, although the optical transparency is not necessarily essential. In order to increase the adhesive property with the fluoropolymer (a), it is preferably a non-crystalline polymer. The polymerized units a are preferably polymerized units having a fluoroaliphatic ring structure as will be described hereinafter with reference to the fluoropolymer (a).

Also in the case of the mixture (f), the proportion of the fluoropolymer (a) contained in the mixture is preferably high from the viewpoint of improvement of e.g. the adhesive property, but in order to maintain the predetermined difference in the refractive index from the fluoropolymer (a), the proportion is inevitably limited. The mixture (f) is preferably optically uniform and highly transparent, but such is not necessarily essential. On the other hand, the fluoropolymer (e) and the fluoropolymer (a) are preferably uniformly miscible polymers for the improvement of the adhesive property with the inner layer. For such a purpose, the fluoropolymer (e) is required to be a polymer having high affinity with the fluoropolymer (a), and accordingly, it is preferably a fluoropolymer containing polymerized units a in the same manner as the above-mentioned fluoropolymer (d). Namely, the fluoropolymer (e) is preferably the same one as the above-mentioned fluoropolymer (d). However, the proportion of the polymerized units a in the fluoropolymer (e) may be smaller than the above-mentioned preferred proportion of the polymerized units a in the fluoropolymer (d). Namely, as the fluoropolymer (e) is used as mixed with the fluoropolymer (a), the adhesive property of the mixture (f) to the inner layer is improved to such an extent that the fluoropolymer (a) is present, even if the proportion of the polymerized units a in the fluoropolymer (e) is small.

The proportion of the fluoropolymer (a) in the mixture (f) is preferably at most 90 mass %, particularly preferably at most 70 mass %. If the proportion is too much, the predetermined difference in the refractive index between the inner layer and the outer layer can not be maintained. There is no particular lower limit in its proportion, because when the fluoropolymer (e) is the fluoropolymer (d), the object can be accomplished even if no fluoropolymer (a) is present, whereby the proportion of the fluoropolymer (a) in the mixture (f) may be very small. However, in order to further improve the adhesive property, etc., it is preferably at least 5 mass %, particularly preferably at least 10 mass %. If the fluoropolymer (e) is not the fluoropolymer (d) (i.e. if it contains no polymerized units a), the proportion of the fluoropolymer (a) in the mixture (f) is preferably at least 10 mass %, particularly preferably at least 30 mass %.

The glass transition temperature Tgc of the fluoropolymer material (c) is preferably 70° C.<Tgc<Tga+30° C. If Tgc is lower than 70° C., a heat deformation is likely to result, and the attenuation loss tends to increase, and in the case of an optical fiber having a protective coating layer formed, displacement is likely to take place between the outer layer and the protective coating layer during the temperature cycle of high temperature and low temperature, whereby a protrusion or a dent is likely to form at the end face of the fiber. On the other hand, if Tgc is (Tga+30° C.) or higher, a difference in the shrinkage rate is likely to form as between the inner layer and the outer layer during cooling at the time of spinning of the optical fiber, whereby a strain is likely to form in the inner layer, which is likely to cause a scattering loss. Accordingly, Tgc is preferably such that the difference from Tga is within 10° C. Further, for the same reason, the melt viscosity of the fluoropolymer material (c) is preferably as close as possible to the melt viscosity of the fluoropolymer (a) in the inner layer.

When the fluoropolymer material (c) is a mixture of two or more polymers, and the two or more polymers are sufficiently uniformly mixed, Tg of the mixture will be a single Tg corresponding to the mass proportions of the respective polymers. In such a case, this single Tg of the mixture is the above-mentioned Tgc. However, if the mixture is not sufficiently uniform, Tg of the mixture may appear as independent Tg (at least two Tg) based on the respective polymers. In such a case, as the polymer mixture in the present invention, Tg of each polymer is preferably within the above-mentioned range.

The fluoropolymer material (c) is preferably a material having no C—H bond, but "having no C—H bond" is not necessarily essential. Namely, the fluoropolymer (d) or the fluoropolymer (e) may be a polymer having a C—H bond. The outer layer is not a portion where light is mainly transmitted, but may suffice if it reflects light leaked from the inner layer when the optical fiber is bent. Accordingly, the fluoropolymer material (c) is not substantially influential over the transmittance of light having a wavelength, the absorption of which takes place by the presence of a C—H bond. When the fluoropolymer material (c) has a C—H bond i.e. when the fluoropolymer (d) or the fluoropolymer (e) has a C—H bond, the proportion of hydrogen atoms bonded to the carbon atoms in the polymer is preferably at most 5 mass %, particularly preferably at most 1 mass %. If the proportion is too high, the refractive index of the polymer increases, and the predetermined difference in the refractive index from the inner layer can not be maintained. As polymerized units having a C—H bond in the fluoropolymer having a small amount of the C—H bond, polymerized units derived from a monomer having one or two fluorine atoms or chlorine atoms of the monomer for the preparation of the fluoropolymer (a), which will be described hereinafter, substituted by hydrogen atoms, may, for example, be mentioned.

In the present invention, the fluoropolymer (a) is not particularly limited so long as it is a fluoropolymer which is non-crystalline and which has substantially no C—H bond where light absorption takes place with near infrared light. However, preferred is a fluoropolymer having a fluorine-containing aliphatic ring structure in its main chain.

"Having a fluorine-containing aliphatic ring structure in its main chain" means a structure wherein at least one carbon atom constituting the aliphatic ring is a carbon atom in a carbon chain constituting the main chain, and a fluorine atom or a fluorine-containing group is bonded to at least a part of carbon atoms constituting the aliphatic rings. The atoms constituting the ring may contain an oxygen atom or a nitrogen atom in addition to carbon atoms. As a fluorine-containing aliphatic ring structure, a fluorine-containing aliphatic ether ring structure is more preferred.

The viscosity in the molten state of the fluoropolymer (a) is preferably from $10^3$ to $10^5$ poise at a melting temperature of from 200 to 300° C. If the melt viscosity is too high, melt spinning tends to be difficult, and further, diffusion of the substance (b) which is required for the formation of the graded refractive index distribution, tends to be difficult, whereby formation of the graded refractive index distribution becomes difficult. On the other hand, if the melt viscosity is too low, there will be a practical problem. Namely, when it is exposed to a high temperature when used as an optical transmission medium for e.g. an electronic appliance or an automobile, it will be softened, and the light transmitting performance will deteriorate.

The number average molecular weight of the fluoropolymer (a) is preferably from $1 \times 10^4$ to $5 \times 10^6$, more preferably from $5 \times 10^4$ to $1 \times 10^6$. If the molecular weight is too small, the heat resistance will be impaired, and if it is too large, formation of an optical transmission medium having a graded refractive index distribution, will be difficult. When this molecular weight is represented by an intrinsic viscosity [η], the intrinsic viscosity is preferably from 0.1 to 1.0, particularly preferably from 0.2 to 0.5, in perfluoro(2-butyltetrahydrofuran) (hereinafter referred to as PBTHF) at 30° C.

The polymer having a fluorine-containing aliphatic ring structure is preferably a polymer obtainable by polymerizing a monomer having a fluorine-containing ring structure (a monomer having a polymerizable double bond between a carbon atom constituting the ring and a carbon atom not-constituting the ring, or a monomer having a polymerizable double bond between two carbon atoms constituting the ring), or a polymer having a fluorine-containing aliphatic ring structure on its main chain, obtainable by cyclic polymerization of a fluorine-containing monomer having at least two polymerizable double bonds.

The polymer having a fluorine-containing aliphatic ring structure in its main chain, obtainable by polymerizing a monomer having a fluorine-containing aliphatic ring structure, is known, for example, in JP-B-63-18964. Namely, a polymer having a fluorine-containing aliphatic ring structure in its main chain can be obtained by homopolymerization of a monomer having a fluorine-containing aliphatic ring structure, such as perfluoro(2,2-dimethyl-1,3-dioxol), or by copolymerizing such a monomer with a radical-polymerizable monomer containing no C—H bond.

The radical polymerizable monomer containing no C—H bond is preferably a polyfluoroolefin having no C—H bond or a vinyl ether type monomer having no C—H bond. The polyfluoroolefin having no C—H bond, may, specifically, be, for example, a polyfluoroolefin such as tetrafluoroethylene, or a perhalopolyfluoroolefin such as chlorotrifluoroethylene. The polyfluoroolefin having no C—H bond or the vinyl ether monomer having no C—H bond, may, specifically, be, for example, a perfluoro(alkyl vinyl ether), a perhalopolyfluoro(alkyl vinyl ether) having some of fluorine atoms thereof substituted by chlorine atoms, or a perfluoro{(alkoxyalkyl)vinyl ether} having an etheric oxygen atom between the carbon atoms of an alkyl group of the perfluoro(alkyl vinyl ether). The carbon number of such a polyfluoroolefin is preferably from 2 to 4, and the carbon number of the alkyl moiety which may have an etheric oxygen atom, in the above-mentioned vinyl ether monomer, is preferably at most 10.

The polymer having a fluorine-containing aliphatic ring structure in its main chain, obtainable by cyclic polymerization of a fluorine-containing monomer having at least two polymerizable double bonds, is known, for example, in JP-A-63-238111 or JP-A-63-238115. Namely, a polymer having a fluorine-containing aliphatic ring structure can be obtained by cyclic polymerization of a monomer such as perfluoro(allyl vinyl ether) or perfluoro(butenyl vinyl ether), or by copolymerizing such a monomer with a radical polymerizable monomer such as tetrafluoroethylene, chlorotrifluoroethylene or perfluoro(methyl vinyl ether).

Further, a polymer having a fluorine-containing aliphatic ring structure in its main chain, may be obtained also by copolymerizing a monomer having a fluorine-containing aliphatic ring structure such as perfluoro(2,2-dimethyl-1,3-dioxol) with a fluorine-containing monomer having at least two polymerizable double bonds such as perfluoro(allyl vinyl ether) or perfluoro(butenyl vinyl ether).

The polymer having a fluorine-containing aliphatic ring structure is preferably one containing at least 20 mol %, particularly preferably at least 40 mol %, of polymerized units having a fluorine-containing aliphatic ring structure, based on the total polymerized units of the polymer having a fluorine-containing alicyclic ring structure, from the viewpoint of transparency, mechanical properties, etc.

Specifically, the above-mentioned polymer having a fluorine-containing aliphatic ring structure may, for example, be one having polymerized units selected from the following chemical formulae. The following formulae 1 and 2 represent examples of the polymerized units formed by polymerization of monomers having fluorine-containing ring structures. The following formulae 3 and 4 represent examples of polymerized units formed by cyclic polymerization of fluorine-containing monomers having two polymerizable double bonds.

In the following formulae 1 to 4, each of $X^1$ to $X^{10}$ which are independent of one another, is a fluorine atom or a perfluoroalkyl group, and some of fluorine atoms may be substituted by chlorine atoms, and some of fluorine atoms in the perfluoroalkyl group may be substituted by chlorine atoms. The carbon number in the perfluoroalkyl group is preferably from 1 to 5, particularly preferably 1. Z is an oxygen atom, a single bond or —OC($R^9R^{10}$)O—. Preferred Z is an oxygen atom.

Each of $R^1$ to $R^{10}$ which are independent of one another, is a fluorine atom, a perfluoroalkyl group or a perfluoroalkoxy group, wherein some of fluorine atoms may be substituted by chlorine atoms, and some of fluorine atoms in the perfluoroalkyl group and the perfluoroalkoxy group, may be substituted by chlorine atoms. The carbon number in the perfluoroalkyl group and the perfluoroalkoxy group is preferably from 1 to 5, particularly preferably 1. Further, $R^1$ and $R^2$, or $R^3$ and $R^4$ may together form a fluorine-containing aliphatic ring, and when p or q is 2 or more, the substituents bonded to different substituted methylene groups may together form a fluorine-containing aliphatic ring. For example, $R^1$ and $R^2$ may together represent a $C_{2-6}$ perfluoroalkylene group.

p is an integer of from 1 to 4, q is an integer of from 1 to 5, and each of s and t which are independent of each other, is from 0 to 5, and s+t represents an integer of from 1 to 6 (provided that when Z is —OC($R^9R^{10}$)O—, s+t may be 0). However, when each of p, q, s and t is an integer of 2 or more, the types of substituents in the plurality of substituted methylenes defined by the number, may be different from one another. For example, when p is two, the two $R^1$ may be different. Likewise, two $R^2$ may be different from each other, preferred p is 1 or 2, and preferred q is 2. Each of s and t is preferably from 0 to 4, and s+t is preferably an integer of from 1 to 4.

Formula 1
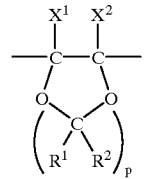

Formula 2
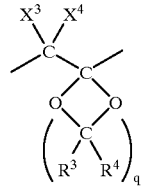

Formula 3
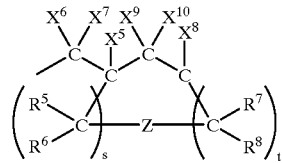

Formula 4
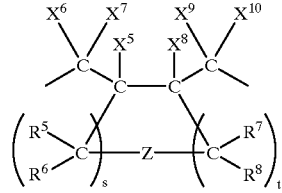

As the monomer to form polymerized units of the Formula 1, a monomer having a fluorine-containing aliphatic ring structure of the following formula 5 (wherein p is 1) and a monomer having a fluorine-containing aliphatic ring structure of the following formula 6 (wherein p is 2) are preferred. Further, as a monomer to form polymerized units of the formula 2, a monomer having a fluorine-containing aliphatic ring structure of the following formula 7 (wherein q is 2) is preferred. In the following formulae, $R^{11}$ and $R^{12}$ are the same as the above-mentioned $R^1$, $R^{21}$ and $R^{22}$ are the same as the above-mentioned $R^2$, $R^{31}$ and $R^{32}$ are the same as $R^3$, and $R^{41}$ and $R^{42}$ are the same as $R^4$. Further, as mentioned above, $R^{11}$ and $R^{22}$, or $R^{31}$ and $R^{42}$, may together form a fluorine-containing aliphatic ring.

Preferred as the compounds of the Formulae 5 to 7, are compounds wherein each of $X^1$ to $X^4$ is a fluorine atom, and each of $R^1$, $R^2$, $R_{11}$, $R_{12}$, $R^{21}$, $R^{22}$, $R^{31}$, $R^{32}$, $R^{41}$ and $R^{42}$, which are independent of one another, is a fluorine atom, a trifluoromethyl group or a chlorodifluoromethyl group. The most preferred compound is a compound of the Formula 5 wherein each of $X^1$ and $X^2$ is a fluorine atom, and each of $R^1$ and $R^2$ is a trifluoromethyl group (i.e. perfluoro(2,2-dimethyl-1,3-dioxol)).

Formula 5

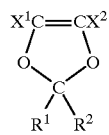

Formula 6

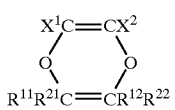

Formula 7

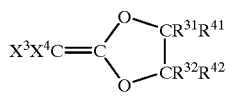

The following compounds may be mentioned as specific examples of the preferred compounds of the Formulae 5 to 7.

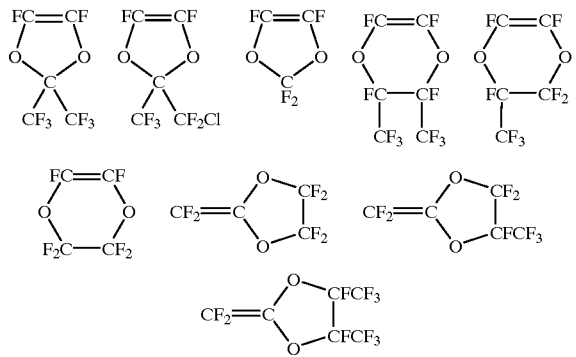

As the fluorine-containing monomer having two polymerizable double bonds, to form the polymerized units of the Formulae 3 and 4 by cyclic polymerization, a monomer of the following formula, may be mentioned. Preferred as the compound of the Formula 8, is a compound wherein Z is an oxygen atom or —OC($R^9R^{10}$)O—, s is 0 or 1, t is from 0 to 4, provided that s+t is from 1 to 4 (provided that when Z is —OC($R^9R^{10}$)O—, s+t may be 0), each of $X^5$ to $X^{10}$ is a fluorine atom, or at most two of them are a chlorine atom, a trifluoromethyl group or a chlorodifluoromethyl group and the rest is a fluorine atom, and each of $R^5$ to $R^{10}$ which are independent from one another, is a fluorine atom, a chlorine atom (provided that at most one per carbon atom is attached), a trifluoromethyl group or a chlorodifluoromethyl group.

Formula 8

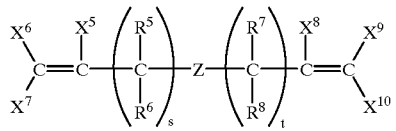

Compounds of the following Formulae 9 to 11 are preferred as examples of the compound of the Formula 8. The compound of the following Formula 9 is a compound of the formula 8 wherein Z is an oxygen atom, s is 0, and t is 1. The compound of the following Formula 10 is a compound of the Formula 8 wherein Z is an oxygen atom, s is 0, and t is 2. The compound of the following Formula 11 is a compound of the Formula 8 wherein Z is —OC($R^9R^{10}$)O—, and each of s and t is 0. In the following Formulae, $R^{71}$ and $R^{72}$ are the same as the above-mentioned $R^7$, and $R^{81}$ and $R^{82}$ are the same as the above-mentioned $R^8$.

In the compound of the Formula 9, it is preferred that $X^5$ to $X^{10}$ are all fluorine atoms, or one or two of them (provided that at most one of $X^5$ to $X^7$ and at most one of $X^8$ to $X^{10}$) are chlorine atoms and the rest is a fluorine atom. It is preferred that $R^7$ and $R^8$ are all fluorine atoms, or one of them is a chlorine atom or a trifluoromethyl group, and the other is a fluorine atom. The most preferred compound of the Formula 9 is a compound wherein $X^5$ to $X^{10}$, $R^7$ and $R^8$ are all fluorine atoms (i.e. perfluoro(allyl vinyl ether)).

In the compound of the formula 10, it is preferred that $X^5$ to $X^{10}$ are all fluorine atoms, or one or two of them (provided at most one of $X^5$ to $X^7$ and at most one of $X^8$ to $X^{10}$) are chlorine atoms, and the rest is a fluorine atom. It is preferred that $R^{71}$, $R^{72}$, $R^{81}$ and $R^{82}$ are all fluorine atoms, or at most two of them are chlorine atoms or trifluoromethyl groups, and the rest is a fluorine atom. The most preferred compound of the Formula 10, is a compound wherein $X^5$ to $X^{10}$, $R^{71}$, $R^{72}$, $R^{81}$ and $R^{82}$ are all fluorine atoms (i.e. perfluoro (butenyl vinyl ether)).

In the compound of the Formula 11, it is preferred that $X^5$ to $X^{10}$ are all fluorine atoms, or one or two of them (provided at least one of $X^5$ to $X^7$ and at least one of $X^8$ to $X^{10}$) are chlorine atoms and the rest is a fluorine atom. It is preferred that $R^9$ and $R^{10}$ are all fluorine atoms, one of them is a chlorine atom or a trifluoromethyl group, and the other is a fluorine atom. The most preferred compound of the Formula 11, is a compound wherein $X^5$ to $X^{10}$, $R^9$ and $R^{10}$ are all fluorine atoms [i.e. perfluoro{bis(vinyloxy)methane}].

Formula 9

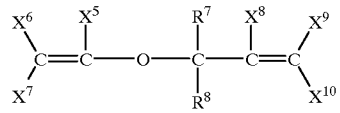

Formula 10

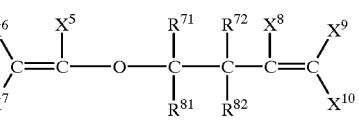

Formula 11

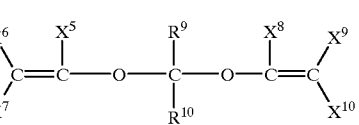

The following compounds may, for example, be mentioned as specific examples of the compounds of the Formulae 9 to 11.

$CF_2$=$CFOCF_2CF$=$CF_2$
$CF_2$=$CFOCF(CF_3)CF$=$CF_2$
$CF_2$=$CFOCF_2CF_2CF$=$CF_2$
$CF_2$=$CFOCF_2CF(CF_3)CF$=$CF_2$
$CF_2$=$CFOCF_2CFClCF$=$CF_2$
$CF_2$=$CFOCCl_2CF_2CF$=$CF_2$
$CF_2$=$CFOCF_2CF_2CCl$=$CF_2$
$CF_2$=$CFOCF_2CF_2CF$=$CFCl$
$CF_2$=$CFOCF_2CF(CF_3)CCl$=$CF_2$
$CF_2$=$CFOCF_2OCF$=$CF_2$

CF$_2$=CFOC(CF$_3$)$_2$OCF=CF$_2$
CF$_2$=CFOCCl$_2$OCF=CF$_2$
CF$_2$=CClOCF$_2$OCCl=CF$_2$

In the above fluoropolymer (d), polymerized units (hereinafter referred to as polymerized units d) other than the polymerized units a, may be the above-mentioned polymerized units having a fluorine-containing aliphatic ring structure, so long as they are not the same as the polymerized units a in the fluoropolymer (a). Further, they may be polymerized units formed by polymerization of a monomer having no fluorine-containing aliphatic ring structure, such as the above-mentioned radical polymerizable monomer containing no C—H bond. The polymerized units d are preferably polymerized units containing fluorine atoms and no C—H bond, but they may be polymerized units containing a small number of hydrogen atoms.

The radical polymerizable monomer containing no C—H bond is preferably a polyfluoroolefin having no C—H bond, or a vinyl ether monomer having no C—H bond, as mentioned above, particularly preferably a perfluoroolefin, or a perfluoro(alkyl vinyl ether) which may have an etheric oxygen atom at the alkyl moiety.

The polymerized units containing a small number of hydrogen atoms, may be polymerized units having a fluorine-containing aliphatic ring structure, or polymerized units having no fluorine-containing aliphatic ring structure. The former may be polymerized units of the above Formulae 1 to 4, wherein parts of $X^1$ to $X^{10}$ and $R^1$ to $R^{10}$ are hydrogen atoms.

The substance (b) is preferably a substance having a difference in the refractive index of at least 0.005 as compared with the fluoropolymer (a) as the matrix resin, and it may have a higher refractive index or a lower refractive index than the fluoropolymer (a). Preferred is an optical fiber wherein the substance (b) is a substance having a higher refractive index than the fluoropolymer (a), and this substance (b) is distributed with a concentration gradient such that the concentration decreases from the center of the optical fiber towards the periphery of the optical fiber. In some cases, an optical fiber is also useful wherein the substance (b) is a substance having a lower refractive index than the fluoropolymer (a), and this substance is distributed with a concentration gradient such that the concentration decreases from the periphery of the optical fiber towards the center. The former optical fiber can be produced usually by disposing the substance (b) at the center and is permitted to diffuse towards the periphery. The latter optical fiber can be prepared by permitting the substance (b) to diffuse from the periphery towards the center.

In the present invention, as the substance (b), it is common to employ a substance having a higher refractive index than the fluoropolymer (a). Namely, the substance (b) is a substance having substantially no C—H bond for the same reason as for the fluoropolymer (a), and its refractive index is preferably larger by at least 0.05 than the fluoropolymer (a). However, if the refractive index is larger, the content of the substance (b) required to form the desired graded refractive index distribution may be small, whereby the lowering of the glass transition temperature may be small. Consequently, the heat resistance of the optical fiber increases, and it is particularly preferred that its refractive index is larger by at least 0.1.

Such a substance (b) is preferably a low molecular weight compound, an oligomer for a polymer, which contains an aromatic ring such as a benzene ring, a halogen atom such as chlorine, bromine or iodine or a linking group such as an ether bond. In the case of a polymer, if the molecular weight is large, the compatibility with the fluoropolymer (a) tends to decrease, whereby a light scattering loss tends to be large, and one having a large molecular weight, is not preferred. On the other hand, in the case of a compound having a small molecular weight, the glass transition temperature of the mixture with the fluoropolymer (a) tends to be low, whereby the heat resistance temperature of the optical fiber is likely to decrease. Accordingly, it is not desirable that the molecular weight is too small. Thus, the number average molecular weight of the compound (b) is preferably from $3\times10^2$ to $2\times10^3$, more preferably from $3\times10^2$ to $1\times10^3$.

Specific compounds of the substance (b) include an oligomer which is a pentamer to octamer of chlorotrifluoroethylene, as disclosed in JP-A-8-5848, an oligomer which is a pentamer to octamer of dichlorotrifluoroethylene, or an oligomer which is a dimmer to pentamer obtainable by polymerization of a monomer (such as a monomer having a chlorine atom) which gives an oligomer having a high refractive index among the above-mentioned monomers for forming the fluoropolymer (a).

Other than the halogen-containing aliphatic compound such as the above oligomer, a halogenated aromatic hydrocarbon or a halogen-containing polycyclic compound, which contains no hydrogen atom bonded to a carbon atom, may also be used. Especially, a fluorinated aromatic hydrocarbon or a fluorine-containing polycyclic compound, which contains only fluorine atoms (or fluorine atoms and a relatively small number of chlorine atoms) as the halogen atoms, is preferred from the viewpoint of the compatibility with the fluoropolymer (a). Further, such a halogenated aromatic hydrocarbon or a halogen-containing polycyclic compound preferably does not have a polar functional group, such as a carbonyl group or a cyano group.

As such a halogenated aromatic hydrocarbon, a compound of the formula Φr-Zb (Φr is a b-valent fluorinated aromatic ring residue having all hydrogen atoms substituted by fluorine atoms, and Z is a halogen atom other than fluorine, —Rf, —CO—Rf, —O—Rf or —CN, wherein Rf is a perfluoroalkyl group, a polyfluoroperhaloalkyl group, or a monovalent Φr, and b is an integer of 0 or at least 1) may, for example, be mentioned. As the aromatic ring, a benzene ring or a naphthalene ring may be mentioned. The carbon number of the perfluoroalkyl group or the polyfluoroperhaloalkyl group as Rf, is preferably at most 5. As the halogen atom other than fluorine, a chlorine atom or a bromine atom is preferred.

Specific compounds may, for example, be 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene, and bromoheptafluoronaphthalene.

As examples of the fluorine-containing polycyclic compound, the following compounds (b-1) to (b-3) as exemplified in JP-A-11-167030, are preferred.

(b-1): A fluorine-containing non-condensed polycyclic compound wherein at least two fluorine-containing rings which are carbon rings or hetero cyclic rings and which have fluorine atoms or perfluoroalkyl groups, are bonded by a linkage containing at least one member selected from the group consisting of a triazine ring, oxygen, sulfur, phosphorus and a metal, said polycyclic compounds having substantially no C—H bond.

(b-2): A fluorine-containing non-condensed polycyclic compound wherein at least three fluorine-containing rings which are carbon rings or hetero cyclic rings and which have fluorine atoms or perfluoroalkyl groups, are bonded directly or by a linkage containing carbon, said polycyclic compounds having substantially no C—H bond.

(b-3): A fluorine-containing condensed polycyclic compound which is a condensed polycyclic compound constituted by at least three carbon rings or hetero cyclic rings and which has substantially no C—H bond.

Particularly preferred as the substance (b) is chlorotrifluoroethylene oligomer, perfluoro(triphenyltriazine), perfluoroterphenyl, perfluoroquatrophenyl, perfluoro (triphenylbenzene) or perfluoroanthracene, since the compatibility with the fluoropolymer (a), particularly with the fluoropolymer having a cyclic structure in its main chain, is good, and the heat resistance is good. By virtue of the good compatibility, the fluoropolymer (a), particularly the fluoropolymer (a) having a ring structure in its main chain, and the substance (b) can easily be mixed by heat melting at a temperature of from 200 to 300° C. Further, after they are dissolved in a fluorine-containing solvent and mixed, the solvent is removed, whereby the two can uniformly be mixed.

The following methods may, for example, be mentioned as specific methods for producing optical fibers by distributing the substance (b) in the fluoropolymer (a) to form a graded index structure. Here, the substance (b) is one having a higher refractive index than the fluoropolymer (a).

A method (1) wherein a columnar molded product made of the fluoropolymer (a), having the substance (b) present at high concentration along the center axis, is prepared, and the substance (b) is diffused by heat diffusion in a radial direction from the center axis to form a graded refractive index distribution, and then, using the obtained columnar molded product as a preform, an optical fiber is formed.

A method (2) wherein, in the method (1), the heat diffusion of the substance (b) is carried out at the same time as the preparation of the optical fiber.

A method (3) wherein at the time of preparing an optical fiber by forming the fluoropolymer (a) into a fiber while melt extruding it, the substance (b) is permitted to be present at high concentration along the center axis, and the optical fiber is produced while permitting the substance (b) to undergo heat diffusion.

A method (4) wherein, in the method (3), a columnar preform is produced having the graded refractive index distribution formed by extrusion molding, and then, an optical fiber is prepared from the preform.

A method (5) wherein the substance (b) is dissolved in a monomer capable of forming the fluoropolymer (a), this solution is put into a rotating cylindrical mold, polymerization of the monomer is permitted to proceed from the periphery towards the center of the cylindrical mold while it is rotated, to form a graded refractive index distribution, and using the obtained cylindrical molded product as a preform, an optical fiber is prepared. In this method (5), the substance (b) has a low solubility in the polymer as compared with in the monomer, whereby, when polymerization is proceeded from the periphery of the cylindrical mold, the substance (b) will be distributed in high concentration at the non-polymerized monomer portion than the polymerized portion, and consequently, at the center axis portion where formation of the polymer is latest, the substance (b) is present at high concentration, and a concentration distribution is formed so that the concentration of the substance (b) lowers from the center axis in a radial direction to form a graded refractive index distribution.

A method (6) wherein, in the method (5), a polymerizable monomer is used as a precursor material for the substance (b). When the polymerizability of this polymerizable monomer (hereinafter referred to as the precursor monomer) is lower than the polymerizability of the monomer capable of forming the fluoropolymer (a), a concentration distribution such that at the center axis portion, the polymer of the precursor monomer (i.e. the substance (b)) is present at high concentration, will be formed in the same manner as in the case of the method (5) wherein the polymerization of the precursor monomer is late.

The outer layer can be formed, for example, as follows.

A cylinder made of the fluoropolymer material (c) is prepared, and inside of this cylinder, an inner layer comprising the fluoropolymer (a) and the substance (b) is formed in accordance with the above-described method, to prepare a preform having the outer layer, and using this preform, an optical fiber is prepared. On the outer circumference of the preform obtained by e.g. the above-method, a layer of the fluoropolymer material (c) to constitute an outer layer, is formed by a method such as coating, and using the preform having such a layer, an optical fiber is prepared.

A cylinder made of the fluoropolymer material (c) having an inner diameter larger than the outer shape of the preform, is prepared, and inside of this cylinder, the preform is fitted in, and the obtained product is integrally spun to obtain an optical fiber. In the above-mentioned melt extrusion method, the outer layer made of the fluoropolymer material (c) is extruded together with the inner layer to produce a preform having the outer layer, or at the same time as the extrusion, direct spinning is carried out to obtain an optical fiber. After preparing an optical fiber having no outer layer, an outer layer is formed by e.g. coating. In the above-method (5), using a cylindrical mold made of the fluoropolymer material (c), a preform integrated with this cylindrical mold, is prepared, and using this preform, an optical fiber is produced.

For example, a preform having a graded refractive index distribution formed, is produced, and then, this preform is fitted in a cylinder made of the fluoropolymer material (c), followed by spinning to obtain an optical fiber. Further, a columnar body comprising an outer layer and an inner layer prior to diffusion of the substance (b), is prepared, and this columnar body is heated to carry out diffusion of the substance (b) to obtain a preform, followed by spinning, to obtain an optical fiber.

A graded index optical fiber obtainable by the present invention can be made to have an attenuation loss of not more than 50 dB for 100 m with a wavelength of from 700 to 1,600 nm. Especially with the fluoropolymer having an aliphatic ring structure in its main chain, an attenuation loss for 100 m can be made to be not more than 10 dB with the same wavelength. It is extremely advantageous that the attenuation loss is such a low level with a relatively long wavelength at a level of from 700 to 1,600 nm. Namely, the same wavelength as the quartz optical fiber can be used, whereby connection to the quartz optical fiber is easy, and there is a further merit in that as compared with a conventional plastic optical fiber where a short wavelength than the wavelength of from 700 to 1,600 nm is obliged to be used, an inexpensive light source will suffice.

Now, the present invention will be described in further detail with reference to Examples. However, it should be understood that the present invention is by no means restricted to such specific Examples. The following Examples 1 to 7 represent Preparation Examples for the polymers, Examples 8 to 14 represent Examples of the present invention, and Examples 15 to 17 represent Comparative Examples.

EXAMPLE 1

30 g of perfluoro(butenyl vinyl ether) (hereinafter referred to as PBVE), 150 g of deionized water, 10 g of methanol and 0.15 g of diisopropylperoxydicarbonate as a polymerization initiator, were charged into an autoclave made of pressure resistant glass and having an internal capacity of 200 ml. The interior of the system was flushed three times with nitrogen, whereupon solution polymerization was carried out at 40° C. for 22 hours. As a result, 26 g of a polymer (hereinafter referred to as polymer A) was obtained.

The intrinsic viscosity [η] of polymer A was 0.24 at 30° C. in PBTHF. The glass transition temperature of polymer A was 108° C. as measured by a thermomechanical analysis (hereinafter referred to as TMA), and it was a transparent glassy polymer which was tough at room temperature. Further, the 10% heat decomposition temperature was 468° C., and the refractive index was 1.342.

EXAMPLE 2

27 g of PBVE, 3 g of perfluoro(2,2-dimethyl-1,3-dioxol) (hereinafter referred to as PDD), 150 g of deionized water, 10 g of methanol and 0.15 g of diisopropylperoxydicarbonate, were charged into an autoclave made of pressure resistant glass and having an internal capacity of 200 ml. The interior of the system was flushed three times with nitrogen, whereupon solution polymerization was carried out at 40° C. for 22 hours. As a result, 27 g of a polymer (hereinafter referred to as polymer B) was obtained.

The intrinsic viscosity [η] of polymer B was 0.25 at 30° C. in PBTHF. From the analysis of the IR spectrum, the content of repeating units (hereinafter referred to as PDD polymerized units; the same applies to repeating units formed by a polymerization reaction of another monomer) formed by the polymerization reaction of PDD, was 11 mol %. The glass transition temperature of polymer B was 112° C. as measured by TMA, and it was a transparent glassy polymer which was tough at room temperature. Further, the 10% heat decomposition temperature was 465° C., and the refractive index was 1.336.

EXAMPLE 3

15 g of PBVE, 8.5 g of PDD, 4.5 g of tetrafluoroethylene (hereinafter referred to as TFE), 100 g of deionized water, 17 g of methanol and 0.28 g of diisopropylperoxydicarbonate as a polymerization initiator, were charged into an autoclave made of stainless steel and having an internal capacity of 200 ml. The interior of the system was flushed three times with nitrogen, whereupon solution polymerization was carried out at 40° C. for 22 hours. As a result, 27 g of a polymer (hereinafter referred to as polymer C) was obtained.

The intrinsic viscosity [η] of polymer C was 0.30 at 30° C. in PBTHF. From the analysis of the NMR spectrum, the molar ratio of PBVE polymerized units:PDD polymerized units:TFE polymerized units was 38:27:35. The glass transition temperature of polymer C was 104° C. as measured by TMA, and it was a transparent glassy polymer which was tough at room temperature. Further, the 10% heat decomposition temperature was 470° C., and the refractive index was 1.328.

EXAMPLE 4

18 g of PBVE, 9 g of perfluoro(5-methyl-3,6-dioxa-1-nonene) ($CF_2=CFOCF_2CF(CF_3)OCF_2CF_2CF_3$; hereinafter referred to as PHVE), 3.5 g of TFE, 120 g of deionized water and 0.15 g of diisopropylperoxydicarbonate, were charged into an autoclave made of stainless steel and having an internal capacity of 200 ml. The interior of the system was flushed three times with nitrogen, whereupon solution polymerization was carried out at 40° C. for 20 hours. As a result, 13 g of a polymer (hereinafter referred to as polymer D) was obtained.

The intrinsic viscosity [η] of polymer D was 0.29 at 30° C. in PBTHF. From the analysis of the NMR spectrum, the molar ratio of PBVE polymerized units:PHVE polymerized units:TFE polymerized units was 49:13:38. The glass transition temperature of polymer D was 55° C. as measured by TMA, and it was a transparent glassy polymer which was tough at room temperature. Further, the 10% heat decomposition temperature was 460° C., and the refractive index was 1.336.

EXAMPLE 5

15 g of perfluoro(2-methylene-4-methyl-1,3-dioxolane) (hereinafter referred to as PMMD), 15 g of TFE, 20 g of dichloropentafluoropropane solvent (hereinafter referred to as R225) and 46 mg of perfluorobezoyl peroxide as a polymerization initiator, were charged into an autoclave made of stainless steel and having an internal capacity of 200 ml. The interior of the system was flushed three times with nitrogen, whereupon solution polymerization was carried out at 70° C. for 3 hours. As a result, 16 g of a polymer (hereinafter referred to as polymer E) was obtained.

The intrinsic viscosity [η] of polymer E was 0.33 at 30° C. in PBTHF. From the analysis of the NMR spectrum, the molar ratio of PMMD polymerized units:TFE polymerized units, was 60:40. The glass transition temperature of polymer E was 78° C. as measured by TMA, and it was a transparent glassy polymer which was tough at room temperature. Further, the 10% heat decomposition temperature was 427° C., and the refractive index was 1.336.

EXAMPLE 6

10 g of PMMD, 14 g of TFE, 10 g of PHVE, 10 g of R225 and 40 mg of perfluorobezoyl peroxide, were charged into an autoclave made of stainless steel and having an internal capacity of 200 ml. The interior of the system was flushed three times with nitrogen, whereupon solution polymerization was carried out at 70° C. for 5 hours. As a result, 16 g of a polymer (hereinafter referred to as polymer F) was obtained.

The intrinsic viscosity [η] of polymer F was 0.33 at 30° C. in PBTHF. From the analysis of the NMR spectrum, the molar ratio of PMMD polymerized units:TFE polymerized units:PHVE polymerized units, was 52:39:9. The glass transition temperature of polymer F was 78° C. as measured by TMA, and it was a transparent glassy polymer which was tough at room temperature. Further, the 10% heat decomposition temperature was 423° C., and the refractive index was 1.332.

EXAMPLE 7

10 g of PBVE, 10 g of 2,2-bis(trifluoromethyl)-1,3-dioxol (hereinafter referred to as HFDD), 8 g of TFE, 10 g of R225 and 50 mg of perfluorobezoyl peroxide, were charged into an autoclave made of stainless steel and having an internal capacity of 200 ml. The interior of the system was flushed three times with nitrogen, whereupon solution polymerization was carried out at 70° C. for 5 hours. As a result, 4.7 g of a polymer (hereinafter referred to as polymer G) was obtained.

The intrinsic viscosity [η] of polymer G was 0.29 at 30° C. in PBTHF. From the analysis of the NMR spectrum, the molar ratio of PBVE polymerized units:HFDD polymerized units:TFE polymerized units, was 35:33:32. The glass transition temperature of polymer G was 84° C. as measured by TMA, and it was a transparent glassy polymer which was tough at room temperature. Further, the 10% heat decomposition temperature was 462° C., and the refractive index was 1.336.

EXAMPLE 8

Polymer A obtained in Example 1 was melted at 250° C. in a cylindrical container, and at the center portion thereof, chlorotrifluoroethylene oligomer (average molecular weight: 760) was injected and diffused as the substance (b) to form a graded refractive index distribution, and the time was adjusted so that the concentration at the center portion became 15 mass %, to prepare a preform having a graded refractive index distribution formed. Outside of this preform was covered with a hollow tube made of polymer B obtained in Preparation Example 2, and in a cylindrical electric heating furnace, spinning was carried out from the forward end at 240° C. to obtain an optical fiber.

The attenuation loss of this optical fiber was measured by a cutback method and was 181 dB/km at a wavelength of 1,300 nm. Further, it was wound on a rod having a radius of 10 mm to carry out bending at 180°, whereby an increase in the attenuation loss was measured (hereinafter referred to as R10 bending loss) and was 0.26 dB. As a comparison, an optical fiber was prepared in the same manner by using polymer A instead of polymer B, whereupon the R10 bending loss was measured and was 2.39 dB. Thus, it is evident that the bending loss became smaller by one figure by providing the outer layer having a refractive index which was lower by 0.006 than the outermost layer of the inner layer.

Further, the above optical fiber was subjected to a test (hereinafter referred to as a heat and humidity cycle test) wherein the fiber was reciprocated ten times between 65° C. under a humidity of 95% and −10° C., whereupon the attenuation loss was measured and was 189 dB/km, whereby no deterioration in performance was observed. Further, this optical fiber was cut, and the cross-section was observed by a scanning electron microscope, whereby the adhesion between the inner layer and the outer layer was confirmed to be good.

EXAMPLES 9 to 14

Using polymer A as the matrix resin for the inner layer, and tris(pentafluorophenyl)-1,3,5-triazine as the substance (b) to form a graded refractive index distribution, and employing each of polymers of Examples 3 to 7, as an outer layer, a graded index optical fiber similar to Example 8 was prepared, and the evaluation tests were carries out. The results are shown in Table 1. Here, Examples 10, 12 and 13 are Examples wherein a polymer mixture was employed, and in the Table, the types of the mixed polymers and the mixed mass ratios in brackets [] are shown.

EXAMPLE 15

Comparative Example

Using a PDD/TFE copolymer (tradename: Teflon AF) manufactured by E. I. du Pont de Nemours and Company, as an outer layer, an optical fiber was prepared in the same manner as in Examples, whereby the attenuation loss was 324 dB/km. This optical fiber was cut, and the cross-section was observed by a scanning electron microscope, whereby it was found that the inner layer and the outer layer were peeled, and the adhesion was poor.

EXAMPLE 16 and 17

Comparative Examples

Using polymer A as the matrix resin for an inner layer and tris(pentafluorophenyl)-1,3,5-triazine as the substance (b) to form a graded refractive index distribution and employing polymer E or polymer F as an outer layer, a graded index optical fiber similar to Example 8 was prepared, and its evaluation tests were carried out. The results are shown in Table 1.

TABLE 1

| Example | Type of polymer for outer layer | R10 bending loss [dB] | Initial attenuation loss [dB/km] | Attenuation loss after heat and humidity test [dB/km] | Presence or absence of peeling between inner and outer layers |
|---|---|---|---|---|---|
| 9 | Polymer C | 0.03 | 69 | 85 | Absent |
| 10 | Polymer C + Polymer A [50/50] | 0.51 | 84 | 81 | Absent |
| 11 | Polymer D | 0.21 | 109 | 97 | Absent |
| 12 | Polymer E + Polymer A [50/50] | 0.84 | 96 | 95 | Absent |
| 13 | Polymer F + Polymer A [60/40] | 0.32 | 97 | 100 | Absent |
| 14 | Polymer G | 0.45 | 70 | 76 | Absent |
| 16 | Polymer E | 0.41 | 251 | 417 | Present |
| 17 | Polymer F | 0.13 | 178 | 315 | Present |

By the optical fiber of the present invention, the attenuation loss of lights with in a range of from ultraviolet region to near infrared region can be made extremely low, and an increase in the attenuation loss by bending can be suppressed, and it has been made possible to have heat resistance and heat and humidity resistance at the same time.

The entire disclosure of Japanese Patent Application No. 2000-175203 filed on Jun. 12, 2000 including specification, claims, drawings and summary are incorporated herein by reference in its entirety.

What is claimed is:

1. A plastic optical fiber which is a graded index optical fiber having a concentric inner/outer at least two layer structure, wherein the inner layer has a graded index structure made of a non-crystalline fluoropolymer (a) having substantially no C—H bond, and the outer layer has a refractive index lower than the refractive index of the outermost portion of the inner layer and is made of a fluoropolymer material (c) selected from the following 1) and 2):

1) a fluoropolymer (d) containing the same polymerized units as the polymerized units in the fluoropolymer (a), and 2) a mixture (f) of a fluoropolymer (a) with another fluoropolymer (e).

2. The plastic optical fiber according to claim 1, wherein the fluoropolymer (d) contains at least 20 mol % of the same polymerized units as the polymerized units in the fluoropolymer (a).

3. The plastic optical fiber according to claim 1, wherein the mixture (f) contains at least 10 mass % of the fluoropolymer (a).

4. The plastic optical fiber according to claim 1, wherein the inner layer contains the fluoropolymer (a) as a matrix, and a substance (b) having a different refractive index is distributed in the matrix to form the graded index structure.

5. The plastic optical fiber according to claim 4, wherein the substance (b) has substantially no C—H bond and has a refractive index which is larger by at least 0.05 than the fluoropolymer (a).

6. The plastic optical fiber according to claim 1, wherein the fluoropolymer (a) is a fluoropolymer having a ring structure in its main chain.

7. The plastic optical fiber according to claim 6, wherein the fluoropolymer having a ring structure in its main chain, contains at least 20 mol % of polymerized units obtained by polymerizing one or more monomers selected from the group consisting of perfluoro(2,2-dimethyl-1,3-dioxol), perfluoro(allyl vinyl ether) and perfluoro(butenyl vinyl ether).

8. The plastic optical fiber according to claim 1, which has a protective coating layer made of a thermoplastic resin, outside the outer layer.

9. The plastic optical fiber according to claim 1, wherein the fluoropolymer material (c) constituting the outer layer has a glass transition temperature Tgc within the following range:

$$70° C. < Tgc < Tga + 30° C.$$

where Tga is the glass transition temperature of the fluoropolymer (a).

10. The plastic optical fiber according to claim 9, wherein the fluoropolymer (d) contains at least 20 mol % of the same polymerized units as the polymerized units in the fluoropolymer (a).

11. The plastic optical fiber according to claim 9, wherein the mixture (f) contains at least 10 mass % of the fluoropolymer (a).

12. The plastic optical fiber according to claim 9, wherein the inner layer contains the fluoropolymer (a) as a matrix, and a substance (b) having a different refractive index is distributed in the matrix to form the graded index structure.

13. The plastic optical fiber according to claim 12, wherein the substance (b) has substantially no C—H bond and has a refractive index which is larger by at least 0.05 than the fluoropolymer (a).

14. The plastic optical fiber according to claim 9, wherein the fluoropolymer (a) is a fluoropolymer having a ring structure in its main chain.

15. The plastic optical fiber according to claim 14, wherein the fluoropolymer having a ring structure in its main chain, contains at least 20 mol % of polymerized units obtained by polymerizing one or more monomers selected from the group consisting of perfluoro(2,2-dimethyl-1,3-dioxol), perfluoro(allyl vinyl ether) and perfluoro(butenyl vinyl ether).

16. The plastic optical fiber according to claim 9, which has a protective coating layer made of a thermoplastic resin, outside the outer layer.

17. The plastic optical fiber according to claim 1, wherein the fluoropolymer material (c) has a refractive index which is lower by at least 0.003 than the refractive index of the outermost portion of the inner layer.

18. The plastic optical fiber according to claim 17, wherein the fluoropolymer (d) contains at least 20 mol % of the same polymerized units as the polymerized units in the fluoropolymer (a).

19. The plastic optical fiber according to claim 17, wherein the mixture (f) contains at least 10 mass % of the fluoropolymer (a).

20. The plastic optical fiber according to claim 17, which has a protective coating layer made of a thermoplastic resin, outside the outer layer.

* * * * *